(12) United States Patent
Ungarelli et al.

(10) Patent No.: US 12,403,745 B2
(45) Date of Patent: Sep. 2, 2025

(54) AIR TREATMENT SYSTEM FOR RECREATIONAL VEHICLES

(71) Applicant: AUTOMOTIVE AC DESIGN & CONSULTING LLC, Wilmington, DE (US)

(72) Inventors: Giuliano Ungarelli, Zola Predosa (IT); Fabrizio Ungarelli, Molinella (IT); Danila Facchinello, Zola Predosa (IT)

(73) Assignee: Automotive Ac Design & Consulting LLC, Wilmington, DE (US)

( * ) Notice: Subject to any disclaimer, the term of this patent is extended or adjusted under 35 U.S.C. 154(b) by 260 days.

(21) Appl. No.: 18/139,972

(22) Filed: Apr. 27, 2023

(65) Prior Publication Data

US 2023/0294478 A1    Sep. 21, 2023

Related U.S. Application Data

(63) Continuation-in-part of application No. PCT/IB2020/061463, filed on Dec. 3, 2020, which is
(Continued)

(51) Int. Cl.
*B60H 1/00* (2006.01)
*B60H 1/22* (2006.01)
(Continued)

(52) U.S. Cl.
CPC ..... *B60H 1/00364* (2013.01); *B60H 1/00007* (2013.01); *B60H 1/00478* (2013.01);
(Continued)

(58) Field of Classification Search
CPC ............ B60H 1/00364; B60H 1/00514; B60H 1/2212; B60H 1/00007; B60H 1/00478;
(Continued)

(56) References Cited

U.S. PATENT DOCUMENTS 3,797,269 A * 3/1974 De Jarlais ............. F24F 13/224
                                                     62/279
3,844,525 A   10/1974 Parmett
(Continued)

FOREIGN PATENT DOCUMENTS

EP    0921361 A2   6/1999
EP    1018624 A2   7/2000
WO    2017104369 A1   6/2017

OTHER PUBLICATIONS

International Search Report for PCT/IB2020/061463 Mailed on Sep. 28, 2021.

*Primary Examiner* — Marc E Norman
(74) *Attorney, Agent, or Firm* — Rivka Friedman

(57) ABSTRACT

This present invention relates to a single body air treatment system for recreational vehicles and is a combination of components working in a scheme so to provide heating, cooling, dehumidification, ventilation, air-purification, heavy-duty drying, into a single body. The system comprising of a cooling air plant having a refrigerating cycle (105,107,108,109) and air heat exchangers acting with electricity and a heating plant having an incorporated fuel/Natural-Gas burner (118,119) acting as air furnace. The system operates heating and cooling simultaneously with in the same air-flow and provides air purification through an antibacterial electrical device. The system also integrates extra pipes to produce extra hot-water in winter while the system operates in heating. The system is integrated with a dedicated resonator chamber to minimize the external noise produce by extraction blowers.

16 Claims, 6 Drawing Sheets

Related U.S. Application Data a continuation of application No. 17/084,224, filed on Oct. 29, 2020, now abandoned.

(51) Int. Cl.
*B60H 1/24* (2006.01)
*B60H 1/32* (2006.01)
*B60H 3/00* (2006.01)
*B60H 3/02* (2006.01)

(52) U.S. Cl.
CPC ....... *B60H 1/00514* (2013.01); *B60H 1/2212* (2013.01); *B60H 1/24* (2013.01); *B60H 1/32* (2013.01); *B60H 3/00* (2013.01); *B60H 3/024* (2013.01); *B60H 2001/006* (2013.01); *B60H 2001/2287* (2013.01)

(58) Field of Classification Search
CPC .... B60H 2001/2287; B60H 1/24; B60H 1/32; B60H 3/00; B60H 3/024
See application file for complete search history.

(56) References Cited

U.S. PATENT DOCUMENTS

| | | | |
|---|---|---|---|
| 2009/0209193 A1* | 8/2009 | Kloster | B60H 1/3204 454/241 |
| 2018/0328618 A1* | 11/2018 | Palmer | F24F 13/0254 |
| 2020/0215879 A1* | 7/2020 | Chevalier | B60H 1/262 |
| 2024/0083219 A1* | 3/2024 | Kelly | B60H 1/00428 |

* cited by examiner

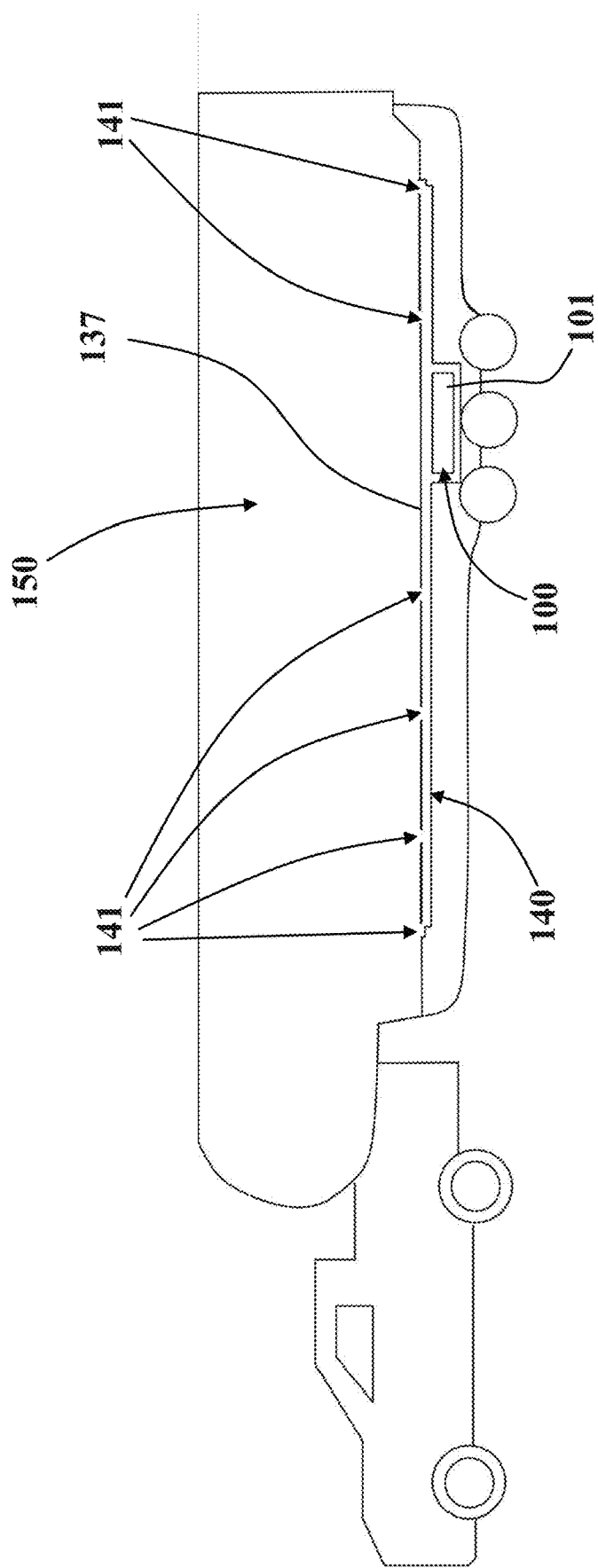

AIR TREATMENT SYSTEM FOR RECREATIONAL VEHICLES

BACKGROUND OF THE INVENTION

Field of the Invention

The present invention relates generally to the field of air treatment systems. More specifically, the present invention relates to an air treatment system for recreational vehicles (RV) or trailers. The innovative design of air treatment system for recreational vehicle enables the system to be placed unconventionally in the lower part of the recreational vehicle or trailer, thereby not occupying any space outside the RV overall dimensions and is not visible outside. The air treatment system provides heating, cooling, dehumidification, ventilation, air purification, heavy-duty drying through a single integrated structure. Accordingly, this disclosure makes specific reference thereto the present invention. Nonetheless, it is to be appreciated that aspects of the present invention are also equally applicable to other like applications, devices and methods of manufacture.

Description of the Related Art

Recreational vehicles often abbreviated as RV is a motor vehicle comprising of living quarters designed for accommodation. Families and retirees often use recreational vehicles to travel places nearby home by road, travel with more of the comforts of home, including pets, or a combination of both. Various types of RVs such as motorhomes, campervans, caravans (also known as travel trailers and camper trailers), fifth-wheel trailers, popup campers, truck campers or the like, are available in the market. The size of the recreational vehicles ranges from the size of being the size of a van all the way up to the size of a large bus.

By way of background, recreational vehicle and trailers industry grew fast, improving quality, living space, comfort, aesthetic look or the like, however, very little innovation has been done in air-treatment devices for these recreational vehicles, which conceptually remain the same since decades. Usually, a plurality of air filters and air conditioner units are used for cleaning and cooling the air inside the recreational vehicle and to provide air ventilation for the users staying inside the recreational vehicle. The air conditioner units are usually heavy and are conventionally installed on a roof surface of the recreational vehicle, in order to save space inside the vehicle. However, weight of such multitude of air conditioners changes the center of gravity and other mechanical dynamics of the vehicle, and creates unbalancing and rocking instability.

The existing air-conditioner technology requires an additional roof reinforcement to support the weight and shocks. The additional roof reinforcement increases the overall weight of the recreational vehicle. The additional weights increase the pulling force required to move the RV or trailer, thereby increase the fuel consumed for the operation of the vehicle.

Additionally the heavy weight, air conditioners are quite large in size and creates resistance particularly to lateral winds, thereby exposing the vehicle to overturning. Moreover, the height of the existing air conditioner over the roof increases the possibility of accidents, damages or injuries caused by contact with trees, wire cables, wrapping with banners, collision with bridges and parking gates, or the like. This causes damage and loss to the user of the recreational vehicles, and requires the user to frequently maintain the vehicle for ready use.

As part of the existing air conditioning technology, a large number of additional parts have to be installed indoor the vehicle to provide air distribution and proper sealing from rain and snow. Also, the current air conditioner technology requires people with extensive experience in the installation, trained maintenance and service which have to be provided working above the roof with safety risks. Further, the placement of the air conditioner units above the vehicle over the roof makes it difficult to service the system, as a person needs to climb the roof for servicing and maintenance of the air treatment system.

Furthermore, different systems or devices are utilized for serving different purposes. For example, a heat furnace with a separate ducting is required for heating air and an air-cooling unit is separately installed for cooling the air. Traditionally, the heating is provided by a furnace, a gas burner powered by natural gas, such as LPG, propane, butane, located in a different place of the vehicle, more often inside the indoor furniture. Use of plurality of air treatment systems makes the complete vehicle heavy and causes problem in the operation of the vehicle. Also, due to use of multiple systems and their installation, space available inside the RV/Trailer is reduced, which increases installation costs and failure possibilities.

Additionally, according to several environmental protection protocols and treaty, modern age technologies have raised strict limitations on the use of refrigerants such as Hydrochlorofluorocarbons (HCFCs), Hydrofluorocarbon (HFC), or the like. However, the technology used for air conditioner system in recreational vehicles is old and of the times when such limitations were not existing, and therefore, such air conditioner systems utilize large quantities of refrigerants, which leads to degradation of environment conditions. Also, the old technology-based conditioner systems have poor efficiency.

The prior HVAC unit described in patent document US 2009/209193 is characterized by a number of drawbacks. In fact, this HVAC unit is designed in order to be integrated inside the lateral walls that internally delimit the living quarters of the recreational vehicle. Therefore, the air intake (the one from which the outside air is sucked inside the HVAC unit) is visible for people standing outside the recreational vehicle, with the consequence that the aesthetic appearance of the recreational vehicle (on which said HVAC unit is installed) is greatly damaged. Moreover, this HVAC unit can only work in a cooling or in a heating mode and therefore cannot provide dehumidification. If dehumidification is required, a separate dehumidification device must be provided.

An apparatus for conditioning air inside a building is known from EP 1018624, which patent document teaches to provide a cooling air plant (condenser, evaporator, compressor) within a first space of a box body and to provide a heating air plant within a second space of the same box body separated from the first space. This apparatus is capable only of providing heating or cooling of the air and cannot in any way dehumidify air, thus requiring an additional dehumidification device if it is desired the option of dehumidifying.

Therefore, there exists a long felt need in the art for an air treatment system for recreational vehicles which performs multiple functions such as cooling, heating, dehumidification, ventilation, etc. There is also a long felt need in the art for an air treatment system for recreational vehicles that can be easily installed on the vehicle without any assistance from an expert or trained person. There is also a long felt need in the art for an air treatment system for recreational vehicles which is light weight and small in size, therefore occupies less space of the recreational vehicle. There is also a long felt need in the art for an air treatment system for recreational vehicles that maintains the center of gravity of the vehicle and does not create unbalancing and rocking instability. Moreover, there is a long felt need in the art for an air treatment system for recreational vehicles that is installed in a position such that the system does not collides with trees, wires, etc., thereby preventing any damages caused to the vehicle and the user due to such collision. Also, there is a long felt need in the art for an air treatment system for recreational vehicles to be installed in a position such that the system is easily reachable and servicing can be performed conveniently. Additionally, there is a long felt need in the art for an air treatment system for recreational vehicles which comprises more than one system such as heating unit, cooling unit, or the like in a single integrated structure. Further, there is a long felt need in the art for an air treatment system for recreational vehicles that complies with the modern environmental protection protocols and treaty, and accordingly use the refrigerants in limited quantity. Finally, there is a long felt need in the art for an air treatment system for recreational vehicles that is efficient, light weight, cost effective and provides user convenience.

The recreational vehicle according to the invention comprises a novel air treatment system which is a single body system comprising a cooling air module having a refrigerating cycle and air heat exchangers working on electricity, a heating module having an incorporated fuel/Natural-Gas burner acting as an air furnace, and a ventilation module to vent out the gases and heat.

The subject matter disclosed and claimed herein, in one embodiment thereof, discloses a single metal sheet body air treatment system comprising a first chamber for providing air treatment, heating, cooling, dehumidification and air-purification, a second chamber to receive the return air, before treatment, a third chamber to remove extra heat absorbed by the system during the air-cooling and a fourth chamber acting as a noise containment, with perforated shields and resonator to low the blower's sound.

In this manner, the novel air treatment system of the present invention for recreational vehicles accomplishes all of the forgoing objectives, and provides a relatively environment friendly, easily installable, light weight, convenient and cost-effective solution to provide features such as air cooling, heating, ventilation, dehumidification, air purification and heavy duty drying by using a single integrated unit. The air treatment system of the present invention is also user friendly, inasmuch as the system is easily installable and serviceable, and do not require an expert or a skilled person to install the system onto the recreational vehicles.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later. The subject matter disclosed and claimed herein, in one embodiment thereof, discloses a novel air treatment system for recreational vehicles (RV) that is placed in the lower part of the RV and thus does not occupy space outside the RV overall dimensions and is also not visible from outside thus giving an aesthetic appeal to the RV. The novel air treatment system of the present invention provides heating, cooling, dehumidification, ventilation, air-purification and heavy-duty drying, all through a single body novel air treatment system. Further, a furnace required to produce heat is integrated into the air treatment system thus using components of the air treatment system.

The novel air treatment system is a single body system comprising a cooling air module having a refrigerating cycle and air heat exchangers working on electricity, a heating module having an incorporated fuel/Natural-Gas burner acting as an air furnace, and a ventilation module to vent out the gases and heat.

The subject matter disclosed and claimed herein, in one embodiment thereof, discloses a single metal sheet body air treatment system comprising a first chamber for providing air treatment, heating, cooling, dehumidification and air-purification, a second chamber to receive the return air, before treatment, a third chamber to remove extra heat absorbed by the system during the air-cooling and a fourth chamber acting as a noise containment, with perforated shields and resonator to low the blower's sound.

The subject matter disclosed and claimed herein, in one embodiment thereof, discloses a recreational vehicle comprising an air treatment system placed in the lower section of the same recreational vehicle, wherein the air treatment system can provide air-cooling and air heating simultaneously. The combination of the fuel burner with air conditioning in the present invention controls indoor temperature, cold or hot, which is not possible with separated dehumidifiers currently available. During the air-cooling performed by the air treatment system, the incoming airflow condensate as much water as possible accordingly to the humidity/temperature conditions of the entering air making the airflow dry and cold, thereafter, the airflow is blown through a heat exchanger thus airflow absorbs heat and expands, thus becoming dried and comfortable. The apparatus eliminates dampness, humidity, molds (by means of an optional antibacterial electrical device), and can be used to dry cloths and furniture and provides a healthy environment even in rainy and wet days, all around the year.

The present invention offers a new system and approach for air-conditioning in recreational vehicle design which does not occupy space outside the RV/Trailer overall dimensions and is not visible outside. The system provides heating, cooling, dehumidification, ventilation, air-purification, heavy-duty drying all in one module and body. The novel system can be easily installed and maintained from the ground, and does not require a user to climb the vehicle for repairing or replacement.

The present invention improves vehicle stability reducing rocking and lower the center of gravity. Further, the system eliminates wind resistance reducing the risk of overturning. Since the system is not placed outside the vehicle or on the vehicle, the system eliminates the risk of collision with trees or wire cables banners, bridges or shrink parking gates and other similar objects.

The system of the present invention is reducing cost and also allows for weight reduction as no additional roof-frames to support external air-conditioners. The components of the present invention can work using alternative energy sources such as solar panels with backup batteries and generators as well.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 10 illustrates a schematic section lateral view of a recreational vehicle according to the present invention, showing in particular the placement of the single metal sheet body of the air treatment system under the living quarters and the treatment air distribution system.

DETAILED DESCRIPTION OF THE SEVERAL EMBODIMENTS

Figure 1:
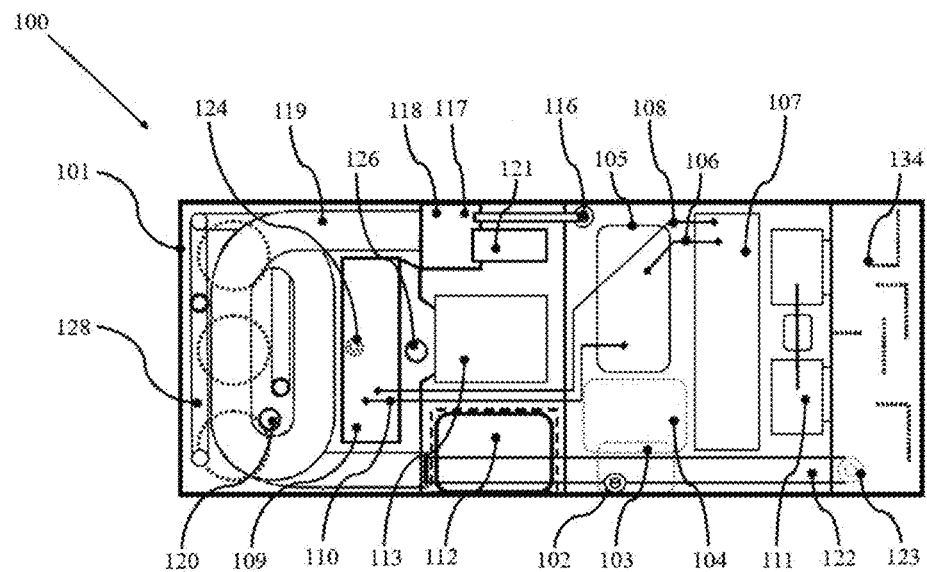
FIG. 1 illustrates a schematic view of the metal body illustrating the distribution of main components of the air treatment system of the recreational vehicle of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for an air treatment system for recreational vehicles which performs multiple functions such as cooling, heating, dehumidification, ventilation, etc. There is also a long felt need in the art for an air treatment system for recreational vehicles that can be easily installed on the vehicle without any assistance from an expert or trained person. There is also a long felt need in the art for an air treatment system for recreational vehicles which is light weight and small in size, therefore occupies less space of the recreational vehicle. There is also a long felt need in the art for an air treatment system for recreational vehicles that maintains the center of gravity of the vehicle and does not create unbalancing and rocking instability. Moreover, there is a long felt need in the art for an air treatment system for recreational vehicles that is installed in a position such that the system does not collides with trees, wires, etc., thereby preventing any damages caused to the vehicle and the user due to such collision. Also, there is a long felt need in the art for an air treatment system for recreational vehicles to be installed in a position such that the system is easily reachable and servicing can be performed conveniently. Additionally, there is a long felt need in the art for an air treatment system for recreational vehicles which comprises more than one system such as heating unit, cooling unit, or the like in a single integrated structure. Further, there is a long felt need in the art for an air treatment system for recreational vehicles that complies with the modern environmental protection protocols and treaty, and accordingly use the refrigerants in limited quantity. Finally, there is a long felt need in the art for an air treatment system for recreational vehicles that is efficient, light weight, cost effective and provides user convenience.

Object of the present invention is a recreational vehicle. With the term "recreational vehicle" it is to be intended any motor vehicle comprising living quarters designed for accommodation of people or any trailer deemed to be attached to a car or van and comprising living quarters. Therefore, the terms "RV", "trailers", "motorhomes", "campervans", "caravans", "fifthwheel trailers", "popup campers" and "truck camper" are interchangeable and all falls within the definition of "recreational vehicle".

The recreational vehicle object of the present invention comprises living quarters 150 designed for accommodation of people and an air treatment system 100, which comprises a single metal sheet body 101.

Referring initially to the drawings, FIG. 1 illustrates a schematic view of the single metal sheet body 101 illustrating the distribution of main components of the air treatment system 100 of the recreational vehicle of the present invention in accordance with the disclosed architecture. The components used in the present invention are all disposed into the single metal sheet body 101, which can preferably be specifically treated to resist corrosion and shocks, acting as the containment. Electrical power supply to the components comprises an electrical power line socket 102, a selector 103 and a power board 104. The electrical power line socket 102 feeds the selector 103 which connects and transforms the power supply commonly available voltage (for example 12 Volts, 24 Volts, 115 Volts or 220 Volts) into the voltage required by the same air treatment system 100 to work (i.e. required by the components of the air treatment system 100 which will be introduced in the description below). A remote switchboard (not shown) preferably provides the normal voltage to the powerline 102.

The single metal sheet body 101 is provided with internal separation in three main chambers (according to some embodiments, the chambers can be more than three, for example there can be an additional chamber). The single metal sheet body 101 comprises a first chamber 510 provided for conditioning a treatment air deemed to the living quarters 150, a second chamber 520 provided for receiving a return air from the living quarters 150 and a third chamber 530 provided for treating a ventilation air to remove a heat absorbed by the same air treatment system 100.

In order to heat the treatment air, the air treatment system 100 comprises a heating air plant, which comprises a fuel or natural-gas burner assembly 118 for producing hot gases by means of a combustion. The heating air plant also comprises a sealed heat-exchanger 119, which receives the hot gases from the burner assembly 118 and is placed within the first chamber 510 to safely exchange the heat of the hot gases through its surfaces (i.e. the surfaces of the sealed heat-exchanger 119) with the treatment air for the living quarters 150.

In order to cool the treatment air, the air treatment system 100 comprises a refrigerator compressor 105 for the compression of a refrigerant fluid. The air treatment system 100 also comprises a condenser heat exchanger 107 that receives the compressed refrigerant fluid from the refrigerator compressor 105 through a first piping 106. Therefore, in particular, during use, the refrigerator compressor 105 is provided for the compression of the refrigerant material into the condenser heat exchanger 107 through the first piping 106. Also, the air treatment system 100 comprises a first blower 111 arranged for sucking the ventilation air from a first air intake 114, for blowing it onto the condenser heat exchanger 107 and for expelling it outside of the single metal sheet body 101 of the air treatment system 100 through a first outlet 136 of the single metal sheet body 101. Both the condenser heat exchanger 107 and the first blower 111 are placed into the third chamber 530. Moreover, the air treatment system 100 comprises an evaporator heat exchanger 109 that receives the refrigerant fluid from the condenser heat exchanger 107 through an orifice tube 108 and absorbs the heat from the return air. Said evaporator heat exchanger 109 is placed in the first chamber 510. Furthermore, the air treatment system 100 is provided with a second blower 113 placed within the second chamber 520 and arranged for sucking the return air from the living quarters 150 through a second air intake 112 of the single metal sheet body 101, for blowing it on the evaporator heat exchanger 109 and on the sealed heat-exchanger 119 to produce the treatment air and for pushing said treatment air from the first chamber 510 to the living quarters 150 through at least one flange 115. In particular, the second chamber 520 and the first chamber 510 communicate with each other (for example by means of an aperture provided on the internal separation of the single metal sheet body 101 between the first chamber 510 and the second chamber 520), so that the second blower 113 in the second chamber 520 can blows the return air on the evaporator heat exchanger 109 and the sealed heat-exchanger 119. Therefore, during use, from the condenser heat exchanger 107, through an orifice tube 108, the refrigerant fluid expands into the evaporator heat exchanger 109 crossed by the return air (which is transformed into the treatment air for the living quarters 150) introduced into the air treatment system 100 through the second air intake 112 which is sucked in by the second blower 113. During the expansion, the refrigerant reduces its temperature, thus, cooling the evaporator heat exchanger 109. Also, the refrigerant fluid absorbs the heat from the return air and then the heated refrigerant returns to the refrigerator compressor 105 through a second piping 110.

The condenser heat exchanger 107 during the cooling operation is kept ventilated by the ventilation air generated by the first blower 111. The ventilation air from the first blower 111 is required to cool the refrigerator compressor 105 and remove the heat from the condenser heat exchanger 107. The exhausted ventilated air is expelled to the outside by means of the first blower 111. During the crossing of the return air through the evaporator heat exchanger 109, the return air gets refrigerated and dried (becoming thus the treatment air) into the first chamber 510. From the first chamber 510, the refrigerated treatment air leaves the air treatment system 100 through flanges 115, in the attached figures at the left extreme of the first chamber 510, and becomes available for the air distribution.

During an air-cooling process, the power board 104 supplies and controls the refrigerator compressor 105, the first blower 111, and the second blower 113.

Therefore, the power board 104 is preferably configured for executing a cooling mode by supplying and controlling the refrigerator compressor 105, the first blower 111 and the second blower 113. In this manner, during the cooling mode (i.e. during the air-cooling process), the first blower 111 sucks the ventilation air from the outside through the first air intake 114 and blows it against the condenser heat exchanger 107 and again to the outside of the third chamber 530, the second blower 113 sucks a return air from the living quarters 150 and blows it against the evaporator heat exchanger 109 to transform said return air into the treatment air for the subsequent distribution to the living quarters 150, while the refrigerator compressor 105 works so that the refrigerant material absorbs heat from the return air (transforming it into the treatment air) and discharges said heat to the ventilation air. Thus, after the air-cooling process, the return air is transformed into a cool treatment air for the living quarters 150.

The air treatment system 100 of the present invention for heating the air can operate in a heating mode, during which in particular an air-heating process is performed. The apparatus 100 integrates a fuel or natural-gas burner assembly 118, arranged for burning fuel or natural gas. The combustible fuel is provided to the burner assembly 118 in particular through a third fitting 116 and its pipe which feeds a valve 117 which supplies the combustible fuel or natural gas. The burner assembly 118 includes sensors and electrodes and fuel orifice. The combustible fuel (or natural gas) then flows through the orifice before and get ignited. The combustible fuel (or natural gas) burns into the sealed heat-exchanger 119, which is advantageously positioned in line after the burner assembly 118. The power board 104 controls the entire burning process that takes place in the air treatment system 100. The sealed heat-exchanger 119 acts as burning chamber and heat exchanger at the same time. The function of the sealed heat-exchanger 119 is to safely exchange the heat generated by the combustion through its surfaces into the first chamber 510 (in the figures, present on the left extreme) where the heat gets released. From the first chamber 510, the heated treatment air leaves the air treatment system 100 through the flanges 115 (at the left extreme of the first chamber 510) and becomes available for the air distribution.

The sealed heat-exchanger 119 internally defines a combustion chamber isolated by the first chamber 510 (i.e. isolated by the return air/treatment air in order to avoid that combustion gases could pollute the return air/treatment air that has to be introduced into the living quarters 150). Thus, the sealed heat-exchanger 119 requires a dedicated air-flow to operate the internal combustion. To provide the proper quantity of air/oxygen required for the combustion, the heating air plant comprises a third blower 121 arranged for feeding the combustion chamber of the sealed heat-exchanger 119 with an air-flow.

During use, the third blower 121 forces air, in particular through the burner assembly 118, into the sealed heat-exchanger 119 to make combustion possible and also to blow out exhaust gasses through an extension pipe 122, which advantageously communicates with the combustion chamber of the sealed heat-exchanger and departs from said sealed heat-exchanger 119. The extension pipe 122 and its external flange 123 are made of stainless steel to extend the lifespan of the air treatment system 100. During an air-heating process, the power board 104 supplies and controls the second blower 113 and the heating air plant.

Therefore, the power board 104 is preferably configured for executing a heating mode by supplying and controlling the second blower 113 and the heating air plant. In this manner, during the heating mode (i.e. during the air-heating process), the second blower 113 sucks a return air from the living quarters 150 and blows it against the sealed heat-exchanger 119 to transform said return air into the treatment air for the subsequent distribution to the living quarters 150, while the burner assembly 118 executes a combustion and the sealed heat-exchanger 119 transfers through its surfaces the heat produced by the combustion to the return air for transforming the latter into an hot treatment air.

Preferably, during said air-heating process, the power board 104 supplies and controls at least the second blower 113, the valve 117, the burner assembly 118 and the third blower 121. Therefore, the power board 104 is preferably configured for executing a heating mode by supplying and controlling the second blower 113 and the valve 117, the burning assembly 118 and the third blower 121 of the heating air plant. In this manner, during the heating mode, the second blower 113 sucks a return air from the living quarters 150 and blows it against the sealed heat-exchanger 119 to transform said return air into the treatment air for the subsequent distribution to the living quarters 150, while the valve 117 opens to supply with combustible fuel or natural gas the burner assembly 118, the burner assembly 118 ignites said combustible fuel or natural gas and the third blower 121 blows an air-flow through the same the burner assembly 118 and inside the combustion chamber of the sealed heat-exchanger 119 to render possible the combustion inside said sealed heat-exchanger 119.

The temperatures of the exhausted gases, the water and the acids produced during the combustion by the air treatment system 100 could damage the same system and, therefore, the extension pipe 122 and its external flange 123 are made of stainless steel to extend the lifespan of the apparatus 100.

Figure 2:
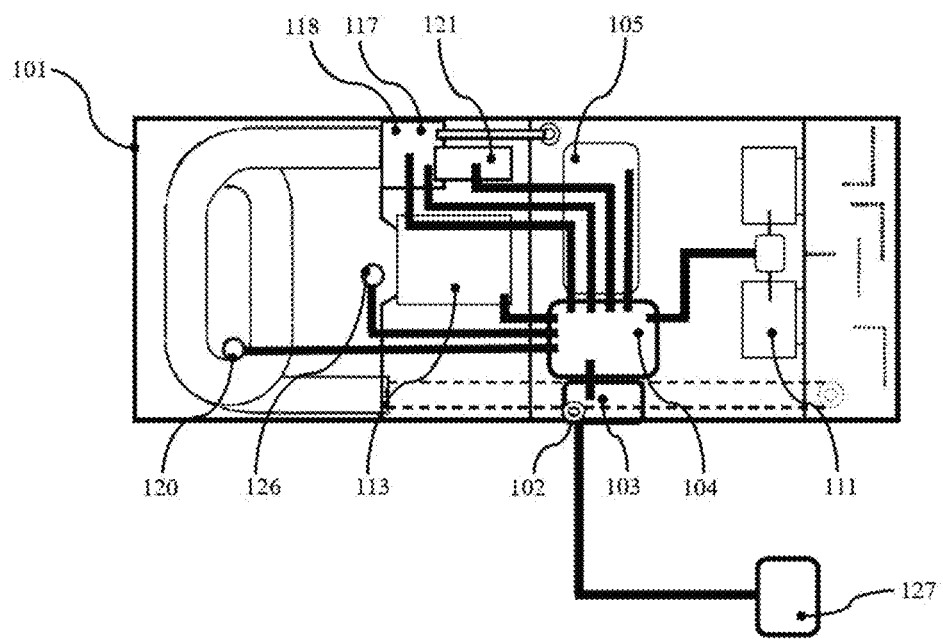
FIG. 2 illustrates a diagrammatic representation of the electrical distribution between the components of the air treatment system of the recreational vehicle of the present invention in accordance with the disclosed architecture.

FIG. 2 illustrates a diagrammatic representation of the electrical distribution between the components of the air treatment system 100 of the present invention in accordance with the disclosed architecture. As previously mentioned, the air treatment system 100 comprises an electrical power supply, which comprises an electrical power line socket 102, a selector 103 for connecting and transforming the commonly available voltage into the voltage required by the air treatment system 100 to work and a power board 104 arranged for supplying and controlling at least the refrigerator compressor 105, the first blower 111, the second blower 113 and the heating air plant. Thus, during use, the electrical power line socket 102 feeds the selector 103 which connects and transforms the power supply commonly available 12 Volts, 24 Volts, 115 Volts or 220 Volts into the voltage required by the air treatment system 100 to work. The electrical power line socket 102, the selector 103, the power board 104 and the remote switchboard 127 provide the necessary electrical power for the components to work for cooling the air, heating the air, dehumidifying the air (as will be described below) and indoor ventilation. A dehumidification mode (which will be described below), the cooling mode and heating mode can be selected by a user through a remote switchboard 127. Thus, the air treatment system 100 advantageously comprises a remote switchboard 127 by means of which a user can control the functioning of the same air treatment system 100, for example by selecting one from the group comprising at least the cooling mode, the heating mode and the dehumidification mode. The power-board 104 supplies and controls the refrigerator compressor 105, the blower 111, the second blower 113. The power board 104 also controls the entire burning process.

Advantageously, the air treatment system 100 comprises an antibacterial electrical device 126 to eliminate airborne spores produced by plants, fungi and molds and purify treatment air for the living quarters 150 from most of airborne bacteria. More in detail, the antibacterial electrical device 126 is placed inside the first chamber 510. In particular, as can be seen from FIG. 1 for example, said antibacterial electrical device 126 is placed between the second blower 113, on the one hand, and the evaporator heat exchanger 109 and the sealed heat-exchanger 119, on the other hand (for example in front of the aperture provided on the internal separation of the single metal sheet body 101 between the first chamber 510 and the second chamber 520). In this manner, the antibacterial electrical device 126 operates on the return air before the latter is transformed into treatment air for the living quarters 150 by the evaporator heat exchanger 109 and/or the sealed heat-exchanger 119.

As shown in FIG. 2, the electrical power is supplied from power board 104 to various components such as thermostat 120, third blower 121, antibacterial electrical device 126, burner assembly 118 through electrical connections. The electrical distribution between the components of the air treatment system 100 of the present invention is supplied in the voltage required for the components to work. It should be appreciated that any component used in the single metal sheet body 101 of the present invention which require electrical power would be provided the power through the power-board 104 which takes the electrical power from remote switchboard 127. The remote switchboard 127 is to be wired from the power-board into the RV/Trailer where users can operate temperatures, ventilation speeds and functions. The remote switchboard 127 can be operated manually or remotely by mean of wi-fi applications through a wireless communication technology such as Wi-Fi, Bluetooth, NFC, Infrared and the like. The remote switchboard 127 may be operated using a smartphone application remotely. Thus, the remote switchboard 127 preferably comprises a wireless communication module for being operated remotely by mean of wi-fi applications.

The thermostat 120 works as a safety device to interrupt combustible fuel or natural gas supply and avoid overheating in case of faults.

The single metal sheet body 101 of the air treatment system 100 is placed under the living quarters 150. In this manner, the single metal sheet body 101 (and therefore the whole air treatment system 100) is at least almost entirely hidden from the sight of the people staying in the living quarters 150 and does not reduce or occupy space deemed for the accommodation of people.

Preferably, the recreational vehicle according to the invention comprises a treatment air distribution system 140, which connects the at least one flange 115 of the first chamber 510 with the living quarters 150 for distributing the treatment air from the first chamber 510 to the living quarters 150.

In particular, the treatment air distribution system 140 is made of distribution ducts departing from the flanges 115 of the first chamber 510 and ending in emission mouths 141 in the living quarters 150.

As the single metal sheet body 101 is placed under the living quarters 150 and the recreational vehicle comprises a treatment air distribution system 140, the air treatment system 100 is hidden from the view of people, no space inside the living quarters 150 or inside the furniture of the same living quarters 150 is occupied by the system 100 and no huge mouths for blowing the treatment air inside the living quarters 150 or for expelling the ventilation air outside of the recreational vehicle (which could be seen from the inside or from the outside of the recreational vehicle) are needed. Indeed, the distribution ducts, which depart from the first chamber 510 (in particular from the flanges 115), can extend below the floor 137 of the living quarters 150 and/or inside the vertical walls delimiting the living quarters 150 of the recreational vehicles, so that a plurality of small (and therefore hardly visible) emission mouths 141 for the treatment air can be provided on the floor 137 of the living quarters 150 and on the vertical walls that delimit the living quarters 150.

Moreover, as preferably the treatment air distribution system 140 comprises a plurality of hidden distribution ducts that end in corresponding emission mouths 141 on the floor 137 or on the vertical walls of the living quarters 150, the flowing of the treatment air inside the living quarters 150 is particularly uniform because the treatment air, in this manner, comes from a plurality of different points distributed in the living quarters 150.

As can be seen from the annexed figures, the single metal sheet body 101 is preferably provided with a top wall 138, with an opposite bottom wall 135 and with a lateral wall 139 connecting the top wall 138 and the bottom wall 135.

In particular, the single metal sheet body 101 is placed under the living quarters 150 with its top wall 138 substantially parallel to and facing the floor 137 of the living quarters 150.

More in detail, the first air intake 114 is provided on the bottom wall 135 of the third chamber of the single metal sheet body 101. This configuration of the first air intake 114 renders the single metal sheet body 101 (and therefore the air treatment system 100) particularly suitable for being placed under the living quarters 150. Indeed, in this manner, the ventilation air can be sucked by the first blower 111 from the space between the lower portion of the recreational vehicle and the road surface. The first air intake 114 is therefore not visible for people standing outside the recreational vehicle and avoids that huge and aesthetically not appealing intake apertures are placed on the sides of the recreational vehicle.

Furthermore, the second air intake 112 is advantageously provided on the top wall 138 of the second chamber 520 of the single metal sheet body 101.

The position of this second air intake 112 renders particularly easy the sucking of the return air by means of the second blower 113 for example by simply providing an opening (and eventually a corresponding duct) on the floor 137 of the living quarters 150 above the second air intake 112. This configuration of the second air intake 112 therefore renders the single metal sheet body 101 (and therefore the air treatment system 100) particularly suitable for being placed under the living quarters 150.

Moreover, the at least one flange 115 is provided on the top wall 138 and/or on the lateral wall 139 of the first chamber 510 of the single metal sheet body 101. In particular, the provision of the flanges 115 on the top wall 138 and/or on the lateral wall 139 renders the installation of the air treatment system 100 under the living quarters 150 particularly easy. For example, this configuration of the flanges 115 permit to reduce the overall length of the distribution ducts of the treatment air distribution system 140.

Figure 3:
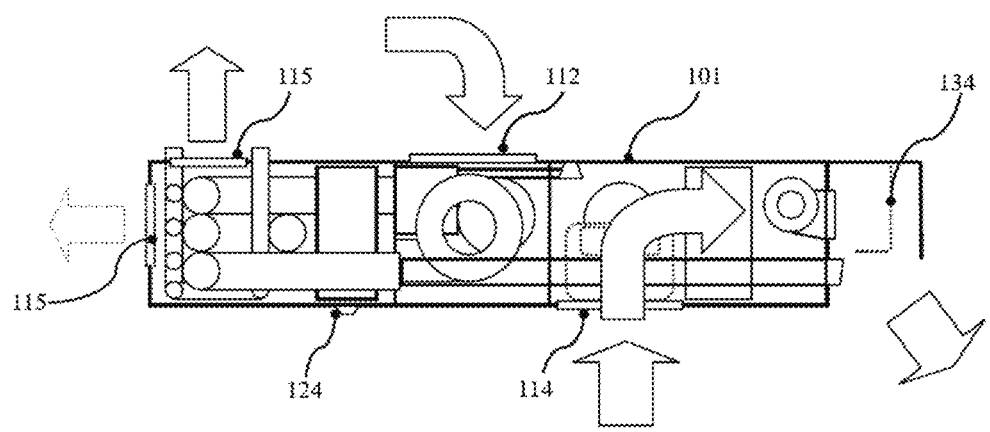
FIG. 3 illustrates a perspective view showing scheme of airflow distribution, airflow entry and exit in the air treatment system of the recreational vehicle of the present invention in accordance with the disclosed architecture.
Figure 4:
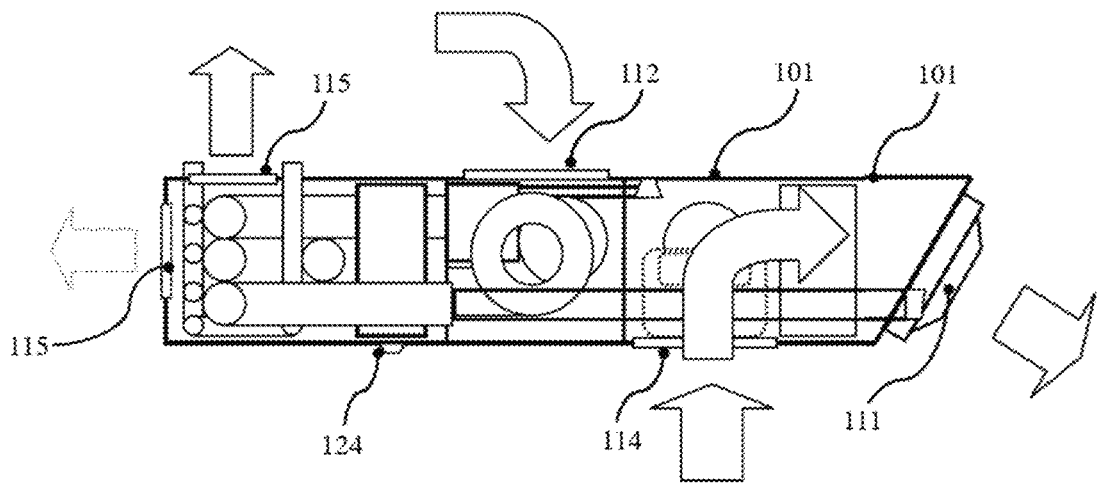
FIG. 4 illustrates an alternative scheme of airflow distribution, airflow entry and exit in the air treatment system of the recreational vehicle of the present invention in accordance with the disclosed architecture.

FIG. 3 illustrates a perspective view showing scheme of treatment, return and ventilation air distribution, air entry and exit in the air treatment system 100 of the present invention in accordance with the disclosed architecture. As shown in the FIG. 3, the flanges 115 are used to vent out the refrigerated treatment air for the treatment air distribution system 140. Similarly, the heated treatment air leaves the air treatment system 100 through the flanges 115 and becomes available for the treatment air distribution system 140. It should be appreciated that flanges 115 installed on the main body 101 can be multiple and in various direction to simplify the air treatment system 100 installation and efficiency. The return air enters from the second air intake 112 passes through the second blower 113, crosses the evaporator heat exchanger 109 and the sealed heat-exchanger 119 before leaving the air treatment system 100 through the flanges 115 and becoming available for the treatment air distribution system 140. Preferably, the air treatment system 100 comprises a dripping pipe 124. More in detail, as can be seen in FIGS. 3 and 4, said dripping pipe 124 is in particular placed in communication with the interior of the first chamber 510, starts from the bottom wall 135 of the single metal sheet body 101 and extends outside of the same first chamber 510. Thus, the condensate water extracted during the cooling of the air is drip outside the apparatus 100 through the dripping pipe 124.

Preferably, the single metal sheet body 101 comprises a fourth chamber 540 operating as a resonator to reduce outside noise of the first blower 111 and, furthermore, the air treatment system 100 comprises punched shields 134 present inside said fourth chamber 540 to help in dying sound waves to reduce noise. This fourth chamber 540 is optional and can be seen for example in the embodiment of FIGS. 1, 2, 3, 5, 6 and 7, while it is not provided in the embodiment of FIG. 4.

As shown, punched shields 134 (used to remove noise) are present in the right most chamber (i.e. the fourth chamber 540) of the air treatment system 100, which chamber operates as a resonator, in which the sound waves reflect against each other and loose energy by mean of punched shields 134.

The ventilation air enters from the first air intake 114, flows around the refrigerator compressor 105, then through the condenser heat exchanger 107 and get expelled to the outside by the first blower 111 through the first outlet 136, as shown in FIG. 3. As can be seen for example in FIGS. 3 and 5, the third chamber 530 and the fourth chamber 540 communicates with each other (by means of the first outlet 136 provided on the internal separation of the single metal sheet body 101 between the third chamber 530 and the optional fourth chamber 540), so that the first blower 111 expels the ventilation air to the outside through the first outlet 136 and through the fourth chamber 540, which opens towards the outside (differently, if the fourth chamber 540 is not present, the third chamber 530 directly opens towards the outside by means of the first outlet 136, in order to discharge the ventilation air blown by the first blower 111).

FIG. 4 illustrates an alternative scheme of airflow distribution, airflow entry and exit in the air treatment system 100 of the present invention in accordance with the disclosed architecture. In the present embodiment, the apparatus 100 does not have the right most chamber (i.e. the fourth chamber 540), which works as a resonator, and in this embodiment the ventilation air is directly expelled to the outside by means of the first blower 111. The length and size of the system 100 of the present embodiment (without fourth chamber 540) is shorter thus, and it is beneficial for smaller RVs with less space and also in which less noise is created.

Figure 5:
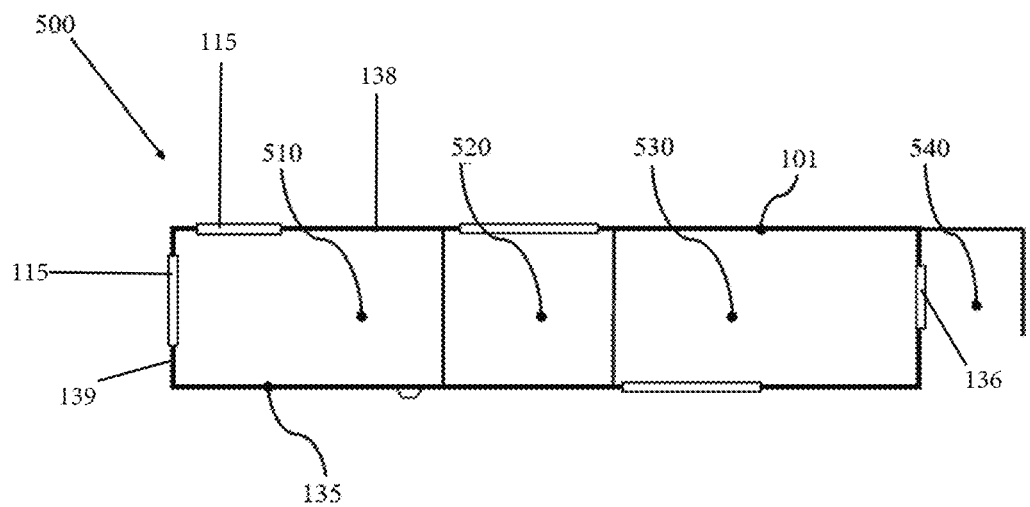
FIG. 5 shows a schematic view of the single metal sheet body of the air treatment system of the recreational vehicle of the present invention illustrating the internal separation of the apparatus made of three main chamber and an optional fourth chamber.

FIG. 5 shows a schematic view of the single metal sheet body 101 of the air treatment system 100 of the recreational vehicle according to the present invention illustrating the internal separation of the apparatus made of three main chambers 510, 520, 530 and an optional fourth chamber 540. As shown, first chamber 510 is responsible for the air treatment, heating, cooling, dehumidification and air-purification. The first chamber 510 also has multiple flanges 115 to vent out both cold and hot treatment air.

A second chamber 520 receives the return air, before treatment. A third chamber 530 contains the components in charge to remove the extra heat absorbed by the air treatment system 100 during the air-cooling. An optional fourth chamber 540 acts as a noise containment, with perforated shields (i.e. punched shields 134) and resonators to low the first blower's 111 extraction noise for user convenience. The single metal sheet body 101 of the air treatment system 100 as well as the components used in the present invention are designed to be shock-proof, compatible with water splashes and the impact of little stones, as per automotive good practice. Further, all internal components are suspended inside to allow a fast and quick inspection of the air treatment system 100 from below by just removing a lower panel 135 (which is the bottom wall 135) of the body 101. One additional advantage that the present invention offers is that the lower panel 135 is also replaceable in case of damages or oxidations to increase the life of the air treatment system 100 and internal components. The entire lower panel 135 can also be lowered and removed for inspection, cleaning, maintenance or replacement of the components.

Figure 6:
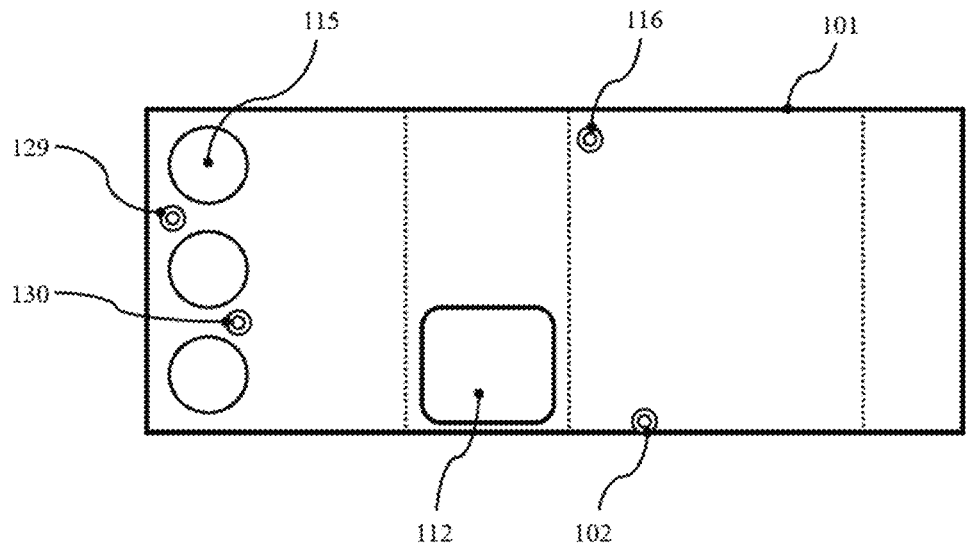
FIG. 6 illustrates a top perspective view of the single metal sheet body of the air treatment system of the recreational vehicle of the present invention in accordance with the disclosed architecture.

FIG. 6 illustrates a top perspective view of the air treatment apparatus body of the present invention in accordance with the disclosed architecture. From the top view, the second air intake 112, electrical power line socket 102, flanges 115 and third fitting 116 are visible. The combustible is provided to the burner assembly 118 through the third fitting 116. The return air enters into the single metal sheet body 101 from the second air intake 112. It should be appreciated that the single metal sheet body 101 is closed from the top such that the efficiency and protection of the components are maintained.

Figure 7:
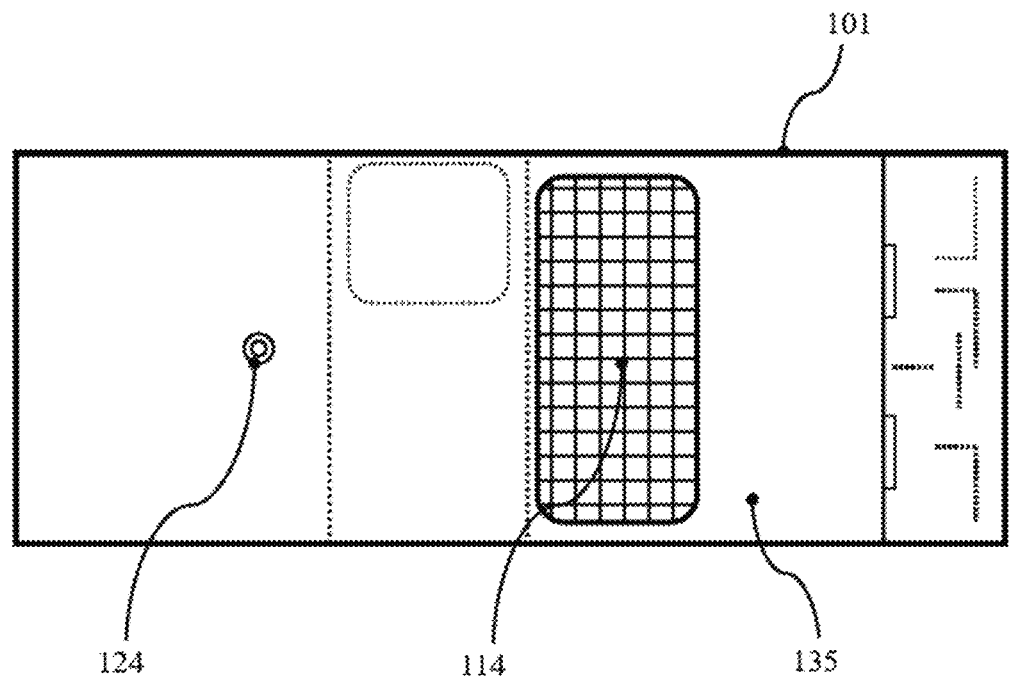
FIG. 7 illustrates a bottom perspective view of the single metal sheet body of the air treatment system of the recreational vehicle of the of the present invention in accordance with the disclosed architecture.

FIG. 7 illustrates a bottom perspective view of the air treatment apparatus body of the present invention in accordance with the disclosed architecture. A dripping pipe 124 is visible which is used to drip the condensate water extracted during the cooling of the air. The entire lower panel 135 is visible of the body 101 in the bottom perspective view of the body 101. From the bottom, first air intake 114 is shown from which ventilation air is entered, which ventilation air is expelled outside through the first blower 111.

Figures 8A, 8B:
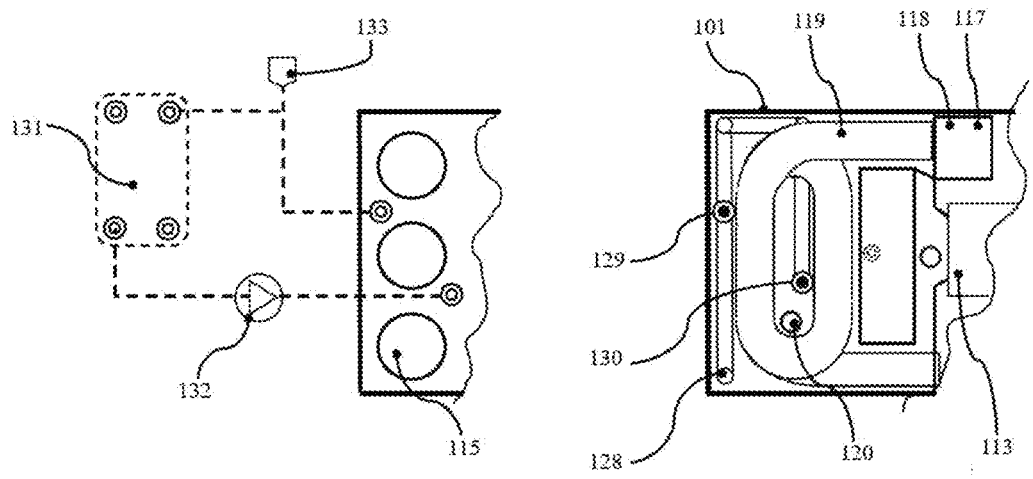
FIGS. 8A and 8B illustrates a schematic example illustrating an embodiment of the air treatment system capable also of producing extra hot water, such as for used in large RV's.

According to a particular embodiment shown in FIGS. 8A and 8B, the air treatment system 100 comprises an optional additional heat-exchanger 128, which is placed in the first chamber 510 after the sealed heat-exchanger 119 along the trajectory followed by the treatment air blown by the second blower 113 and is arranged for producing extra hot water. Thus, during a heating mode, this additional heat-exchanger 128 absorbs heat from the sealed heat exchanger 119. More in detail, the recreational vehicle comprises a secondary closed circuit for a coolant, wherein the additional heat-exchanger 128 is part of said secondary closed circuit and is arranged for receiving a coolant from a first fitting 129 (preferably placed on the top wall 138, as can be seen from FIG. 6) and for discharging said coolant from a second fitting 130 (preferably placed on the top wall 138, as can be seen from FIG. 6). Thus, the air treatment system 100 comprises a first fitting 129, through which the coolant enters the additional heat-exchanger 128, for example when pushed by the pump 132 (described below), and a second fitting 130, through which the coolant leaves the additional heat-exchanger 128, for being directed for example to a water tank (in this case the coolant must be water) or to a plate-heat-exchanger 131 (described below—in this case the coolant can be also a different fluid instead of water). Therefore, during a heating mode (or air-heating process), a cold coolant enters the additional heat-exchanger 128 through the first fitting 129, flows within said additional heat-exchanger 128 absorbing heat from the sealed heat-exchanger 119 and exits from the additional heat-exchanger 128 by means of the second fitting 130. The coolant could be for example water, which increases its temperature by flowing through the additional heat exchanger 128 during a heating mode and exits through the second fitting 130. The water as coolant can be directed from the second fitting 130 to the inside of a water tank (which is therefore part of the secondary closed circuit).

Differently, the recreational vehicle comprises a plate-heat-exchanger 131, placed inside said living quarters 150 and the secondary closed circuit is placed to connect the plate-heat-exchanger 131, and the additional heat-exchanger 128 and is intercepted by a pump 132 arranged for circulating the coolant inside the secondary closed circuit between the plate-heat-exchanger 131 and the additional heat-exchanger 128. In this variant, the coolant is preferably an antifreeze and not water and the plate-heat-exchanger 131 is for example placed to heat a water tank.

Thus, the additional heat-exchanger 128 is placed in the extreme left chamber (i.e. the first chamber 510) in the same airflow generated by the second blower 113 after the sealed heat-exchanger 119. The additional heat-exchanger 128 is placed to produce extra hot water in winter particularly in large RV's where hot-water demand can be increased by the number of people or when water tanks may chill down in very cold environment.

FIGS. 8A and 8B illustrates a schematic example illustrating said particular embodiment for producing extra hot water by the air treatment system 100 such as for used in large RV's. This present embodiment gives the advantage of producing extra hot water in winter particularly in large RV's where hot-water demand can be increased by the number of people or when water tanks present in the RV may chill down in very cold environment. The present embodiment builds a secondary closed circuit using antifreeze as transfer heat fluid instead of water which results also better to prevent oxidations and freezing. As shown in FIG. 8B, an additional heat-exchanger 128 is placed in the first chamber 510 in the same air-flow generated by the blower 113 after the heat-exchanger 119. In cold environments the usage of antifreeze as transfer heat is furthermore recommended to protect the heat-exchanger 128 when the air treatment system 100 is not working. The coolant enters from the first fitting 129 by mean of the pump 132 and leaves from the second fitting 130 to reach a plate-heat-exchanger 131 located inside the RV/Trailer. In FIG. 8A, an expansion/refill tank 133 is also preferably part of the secondary closed circuit. The plate-heat-exchanger 131 can be connected accordingly to satisfy various needs and desires of the user. The present embodiment may be used to provide hot water to store into an insulated tank or keeping existing water tanks protected from freezing.

Figure 9:
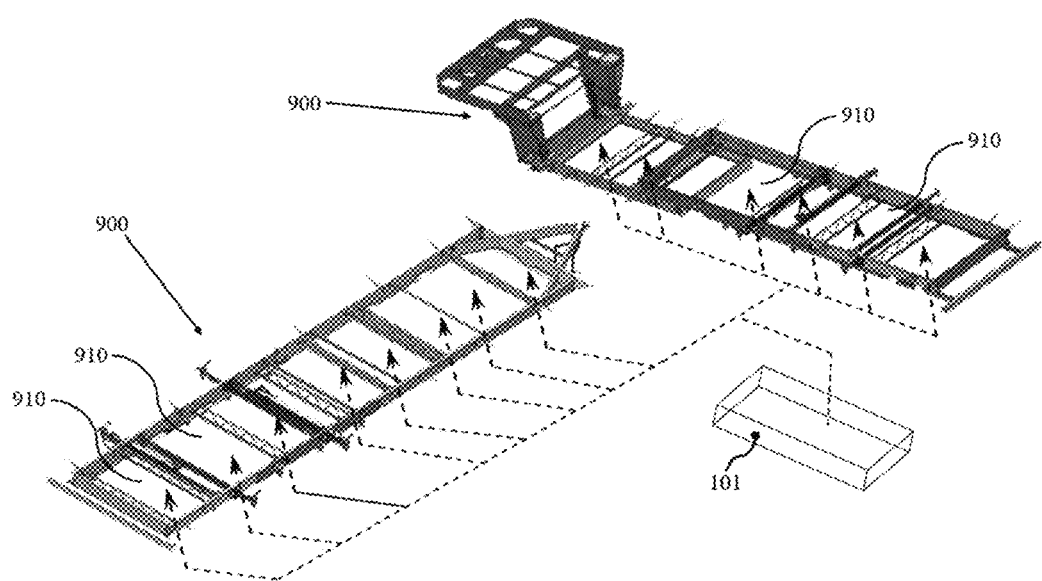
FIG. 9 illustrates a schematic view of the placement of single metal sheet body of the air treatment system in the space available under the living quarters of the recreational vehicle.

FIG. 9 illustrates a schematic view of the placement of single metal sheet body 101 of the air treatment system 100 in the space available under the living quarters 150 of the RV/Trailer. Advantageously, the living quarters 150 are below delimited by a floor 137 and the single metal sheet body is placed within a storage compartment 910 provided under said floor 137. Preferably, the recreational vehicle comprises structural frames 900 under the living quarters 150 and the single metal sheet body 101 of the air treatment system 100 can be placed in a storage compartment 910 defined between said structural frames 900. This embodiment with the single metal sheet body 101 placed in a storage compartment 910 defined between structural frames 900 allows to use for the same single metal sheet body 101 a space that difficulty could be used for other scopes and that is therefore generally underexploited. In particular, the structural frames 900 comprise longitudinal structural frames 900, which are substantially parallel to the advancement direction of the recreational vehicle, and transversal structural frames 900, which are substantially orthogonal to the longitudinal structural frames 900 to define storage compartments 910 that are, in plant view, substantially rectangular (in FIG. 9, there are depicted on the left the structural frames 900 of a recreational vehicle in form of trailer and on the right the structural frames 900 of a recreational vehicle in form of a motor vehicle).

The power board 104 is arrangeable to make the heating air plant and the cooling air plant to work simultaneously, so that the evaporator heat exchanger 109 dries the return air and the sealed burner 119 heats the return air received from the evaporator heat exchanger 109 to produce said treatment air dried and hot.

Therefore, the power board 104 is preferably configured for executing a dehumidification mode by supplying and controlling the refrigerator compressor 105, the first blower 111, the second blower 113 and the heating air plant. In this manner, during the dehumidification mode:

the first blower 111 sucks the ventilation air from the outside through the first air intake 114 and blows it against the condenser heat exchanger 107 and again to the outside of the third chamber 530, the second blower 113 sucks a return air from the living quarters 150 and blows it firstly against the evaporator heat exchanger 109 in order to cool down the return air and to condensate the water vapor carried within said return air and secondly against the sealed heat exchanger 119 in order to reheat said cool and dry treatment air and transforming it into a hot and dried treatment air, the sealed heat-exchanger 119 transfers heat generated by the combustion to the return air cooled down and dried by the evaporator heat exchanger 109, and the refrigerator compressor 105 works so that the refrigerant fluid absorbs heat from the return air by flowing through the evaporator heat exchanger 109 and discharges said heat to the ventilation air by flowing through the condenser heat exchanger 107.

Thus, after the dehumidification mode, the return air is transformed into a dry and hot treatment air for the living quarters 150.

Thus, the air treatment system 100 of the present invention has the ability to operate heating and cooling simultaneously with in the same return air, even controlling temperature cold or hot, thus becoming an effective drier all year around to eliminate damp, humidity, molds, dry cloths and furniture's and provide a healthy environment even in rainy and wet days.

As previously stated, the air treatment system 100 advantageously comprises an antibacterial electrical device 126. More in detail, this antibacterial electrical device 126 is placed inside the first chamber 510, so that it can operate on the return air/treatment air. In particular, the antibacterial device 126 is placed between the second blower 113, on the one hand, and the sealed heat-exchanger 119 and the evaporator heat exchanger 109, on the other hand. Thus, additionally, air purification is obtained by said antibacterial electrical device 126 capable to eliminate airborne spores produced by plants, fungi and molds and therefore capable to purify the return air/treatment air from most of airborne bacteria. Moreover, the system may integrate extra pipes (i.e. the additional heat-exchanger 128) to produce extra hot-water in winter while the air treatment system 100 operates in heating mode. Finally, the air treatment system 100 may be integrated with a dedicated resonator chamber (i.e. the fourth chamber 540) to minimize the external noise produce by extraction blowers (i.e. the first blower 111).

The air treatment system 100 of the present invention is a combination of components working in a scheme to provide Heating, Cooling, Dehumidification, Ventilation, Air-Purification, heavy-Duty Drying, into a single body, which is thus easy to install, maintain, replace and maintain. Further, the air treatment system 100 is lightweight, consumes less space and is installed in the lower section of RV thus does not reduce the appearance of the RV/Trailer.

The cooling air plant of the air treatment system 100 has a refrigerating cycle air heat exchangers (i.e. the condenser heat exchanger 107 and the evaporator heat exchanger 109) acting with electricity (as the refrigerator compressor 105 is supplied by the power board 104). The heating air plant has an incorporated fuel/Natural-Gas burner 118 acting as air furnace.

The air treatment system 100 of the recreational vehicle of the present invention reduces the quantity of the refrigerant fluid used for cooling, thus is environmentally friendly, which may affect the global warming and reconsidered a new way of miniaturization to spare space and raw materials. Alternative sources such as solar energy, wind energy, generators may be used. The single metal sheet body 101 of the present invention is designed to be placed unconventionally in the lower part of the recreational vehicle according to the invention. The various size of the existing vehicles or trailers impose a minimum and a maximum apparatus thickness to respect the distance from the ground and possibly fit between the structural frames 900. The inner components are sized to satisfy air cooling needs in the range from one to three times the today's most popular standards, taking as reference one roof-top ac's, so eliminating a multitude of airconditioners as used nowadays.

Certain terms are used throughout the following description and claims to refer to particular features or components. As one skilled in the art will appreciate, different persons may refer to the same feature or component by different names. This document does not intend to distinguish between components or features that differ in name but not structure or function.

Notwithstanding the forgoing, the air treatment system 100 of the recreational vehicle of the present invention can be of any suitable size and configuration as is known in the art without affecting the overall concept of the invention, provided that it accomplishes the above stated objectives. One of ordinary skill in the art will appreciate that the size, configuration and material of the air treatment system 100 as shown in the FIGS, are for illustrative purposes only, and that many other sizes and shapes of the air treatment system 100 are well within the scope of the present disclosure. Although the dimensions of the air treatment system 100 are important design parameters for user convenience, the air treatment 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A recreational vehicle comprising:
   living quarters designed for accommodation of people;
   an air treatment system comprising:
      single metal sheet body provided with internal separation in at least three main chambers; wherein a first chamber is provided for conditioning a treatment air deemed to the living quarters, a second chamber is provided for receiving a return air from the living quarters before treatment and a third chamber is provided for treating a ventilation air;
      a heating air plant comprising:
         a fuel or natural-gas burner assembly for producing hot gases by means of a combustion process;
         a sealed heat-exchanger which receives the hot gases from said burner assembly and is placed within said first chamber to exchange the heat of the hot gas through its surfaces with the treatment air for the living quarters;
      a cooling air plant comprising:
         a refrigerator compressor for the compression of a refrigerant fluid;
         a condenser heat exchanger that receives the compressed refrigerant fluid from said refrigerator compressor through a first piping;
         a first blower arranged for sucking said ventilation air from a first intake of said single metal sheet body, for blowing it onto said condenser heat exchanger and for expelling it to the outside of the single metal sheet body of the air treatment system through a first outlet of said single metal sheet body; said condenser heat exchanger and said first blower being placed into said third chamber;
         an evaporator heat exchanger that receives the refrigerant fluid from said condenser heat exchanger through an orifice tube and absorbs the heat from said return air; said evaporator heat exchanger being placed within said first chamber;
         a second blower placed within the second chamber and arranged for sucking the return air from the living quarters through a second air intake of said single metal sheet body, for blowing it into said first chamber on said evaporator heat exchanger and on said sealed heat-exchanger to produce said treatment air and for pushing said treatment air from said first chamber to the living quarters through at least one flange;
      an electrical power supply comprising a power line socket, a selector for connecting and transforming an available voltage into a voltage required by the air treatment system to work and a power board arranged for supplying and controlling at least the refrigerator compressor, the first blower, the second blower and the heating air plant;
      said power board being arrangeable to make the heating air plant and the cooling air plant to work simultaneously, so that the evaporator heat exchanger dries the return air and the sealed heat-exchanger heats the return air received from the evaporator heat exchanger to produce said treatment air dried and hot;
      said single metal sheet body being placed under the living quarters;
      said single metal sheet body comprising a fourth chamber operating as a resonator to reduce outside noise of the first blower;
      said air treatment system comprising punched shields present inside the fourth chamber to help in dying sound waves to reduce noise.

2. The recreational vehicle of claim 1, wherein said living quarters are below delimited by a floor;
   the single metal sheet body being placed within a storage compartment provided under said floor.

3. The recreational vehicle of claim 2, further comprising structural frames under the living quarters;
   the single metal sheet body of said air treatment system being placed in said storage compartment defined between said structural frames.

4. The recreational vehicle of claim 1, wherein the single metal sheet body of said air treatment system is provided with a top wall, with an opposite bottom wall, and with a lateral wall connecting the top wall and the bottom wall;

said first air intake being provided on the bottom wall of the third chamber of said single metal sheet body.

5. The recreational vehicle of claim 4, wherein said second air intake is provided on the top wall of the second chamber of said single metal sheet body.

6. The recreational vehicle of claim 4, wherein said at least one flange is provided on the top wall and/or on the lateral wall of the first chamber of said single metal sheet body;
said recreational vehicle comprising a treatment air distribution system, which connects said at least one flange of said first chamber with the living quarters for distributing said treatment air from said first chamber to the living quarters.

7. The recreational vehicle of claim 4, wherein said air treatment system comprises a dripping pipe, which is placed in communication with the interior of said first chamber, starts from the bottom wall of said single metal sheet body and extends outside of said first chamber.

8. The recreational vehicle of claim 1, wherein said second blower is located upstream of said evaporator heat exchanger, which is placed between said second blower and said sealed heat-exchanger so that said second blower forces the return air to pass first through said evaporator heat exchanger and then through said sealed heat-exchanger.

9. The recreational vehicle of claim 8, wherein said sealed heat-exchanger comprises a shaped tube conveying the hot gases and placed in front of said evaporator heat exchanger.

10. The recreational vehicle of claim 1, wherein said sealed heat-exchanger internally defines a combustion chamber isolated from the first chamber;
said heating air plant comprising a third blower arranged for feeding the combustion chamber of said sealed heat-exchanger with an air-flow.

11. The recreational vehicle of claim 1, wherein the said air treatment system comprises a remote switchboard by means of which a user can control the functioning of the same air treatment system.

12. The recreational vehicle of claim 11, wherein said remote switchboard comprises a wireless communication module for being operated remotely by mean of wi-fi applications.

13. A recreational vehicle comprising:
living quarters designed for accommodation of people;
an air treatment system comprising:
single metal sheet body provided with internal separation in at least three main chambers; wherein a first chamber is provided for conditioning a treatment air deemed to the living quarters, a second chamber is provided for receiving a return air from the living quarters before treatment and a third chamber is provided for treating a ventilation air;
a heating air plant comprising:
a fuel or natural-gas burner assembly for producing hot gases by means of a combustion process;
a sealed heat-exchanger which receives the hot gases from said burner assembly and is placed within said first chamber to exchange the heat of the hot gas through its surfaces with the treatment air for the living quarters;
a cooling air plant comprising:
a refrigerator compressor for the compression of a refrigerant fluid;
a condenser heat exchanger that receives the compressed refrigerant fluid from said refrigerator compressor through a first piping;
a first blower arranged for sucking said ventilation air from a first intake of said single metal sheet body, for blowing it onto said condenser heat exchanger and for expelling it to the outside of the single metal sheet body of the air treatment system through a first outlet of said single metal sheet body; said condenser heat exchanger and said first blower being placed into said third chamber;
an evaporator heat exchanger that receives the refrigerant fluid from said condenser heat exchanger through an orifice tube and absorbs the heat from said return air; said evaporator heat exchanger being placed within said first chamber;
a second blower placed within the second chamber and arranged for sucking the return air from the living quarters through a second air intake of said single metal sheet body, for blowing it into said first chamber on said evaporator heat exchanger and on said sealed heat-exchanger to produce said treatment air and for pushing said treatment air from said first chamber to the living quarters through at least one flange;
an electrical power supply comprising a power line socket, a selector for connecting and transforming an available voltage into a voltage required by the air treatment system to work and a power board arranged for supplying and controlling at least the refrigerator compressor, the first blower, the second blower and the heating air plant;
said power board being arrangeable to make the heating air plant and the cooling air plant to work simultaneously, so that the evaporator heat exchanger dries the return air and the sealed heat-exchanger heats the return air received from the evaporator heat exchanger to produce said treatment air dried and hot;
said single metal sheet body being placed under the living quarters;
wherein said air treatment system comprises an additional heat-exchanger, which is placed in the first chamber after the sealed heat-exchanger, along a trajectory followed by said treatment air blown by said second blower, and is arranged for producing hot water.

14. The recreational vehicle of claim 13, further comprising a secondary closed circuit for a coolant;
said additional heat-exchanger being part of said secondary closed circuit and arranged for receiving a coolant from a first fitting and for discharging said coolant from a second fitting.

15. The recreational vehicle of claim 14, further comprising a plate-heat-exchanger placed inside said living quarters;
said secondary closed circuit being placed to connect said plate-heat-exchanger and said additional heat-exchanger and being intercepted by a pump arranged for circulating said coolant inside said secondary closed circuit between the plate-heat-exchanger and the additional heat-exchanger.

16. The recreational vehicle of claim 15, wherein the coolant is an antifreeze.

* * * * *